April 28, 1925.
V. CAMPAS
WHEEL GAUGE
Filed May 27, 1924
1,535,574
2 Sheets-Sheet 1
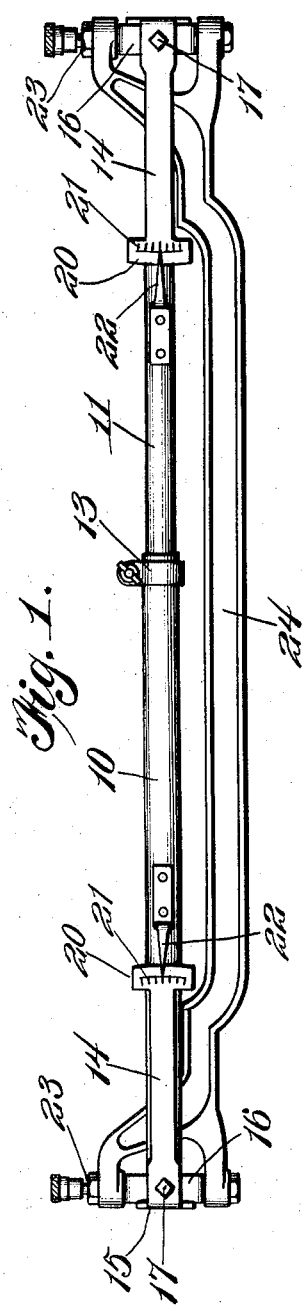
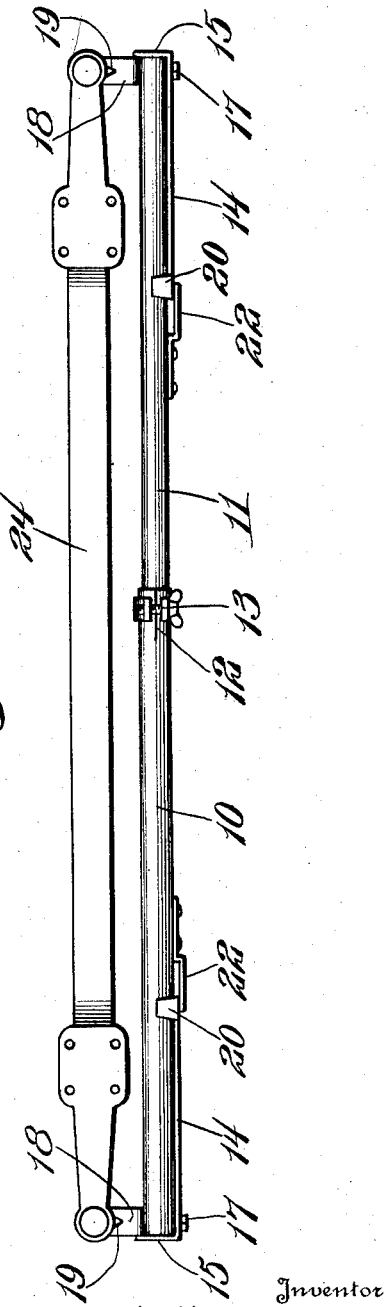
Inventor
Vincent Campas
Watson E. Coleman
Attorney April 28, 1925.
V. CAMPAS
1,535,574
WHEEL GAUGE
Filed May 27, 1924     2 Sheets-Sheet 2
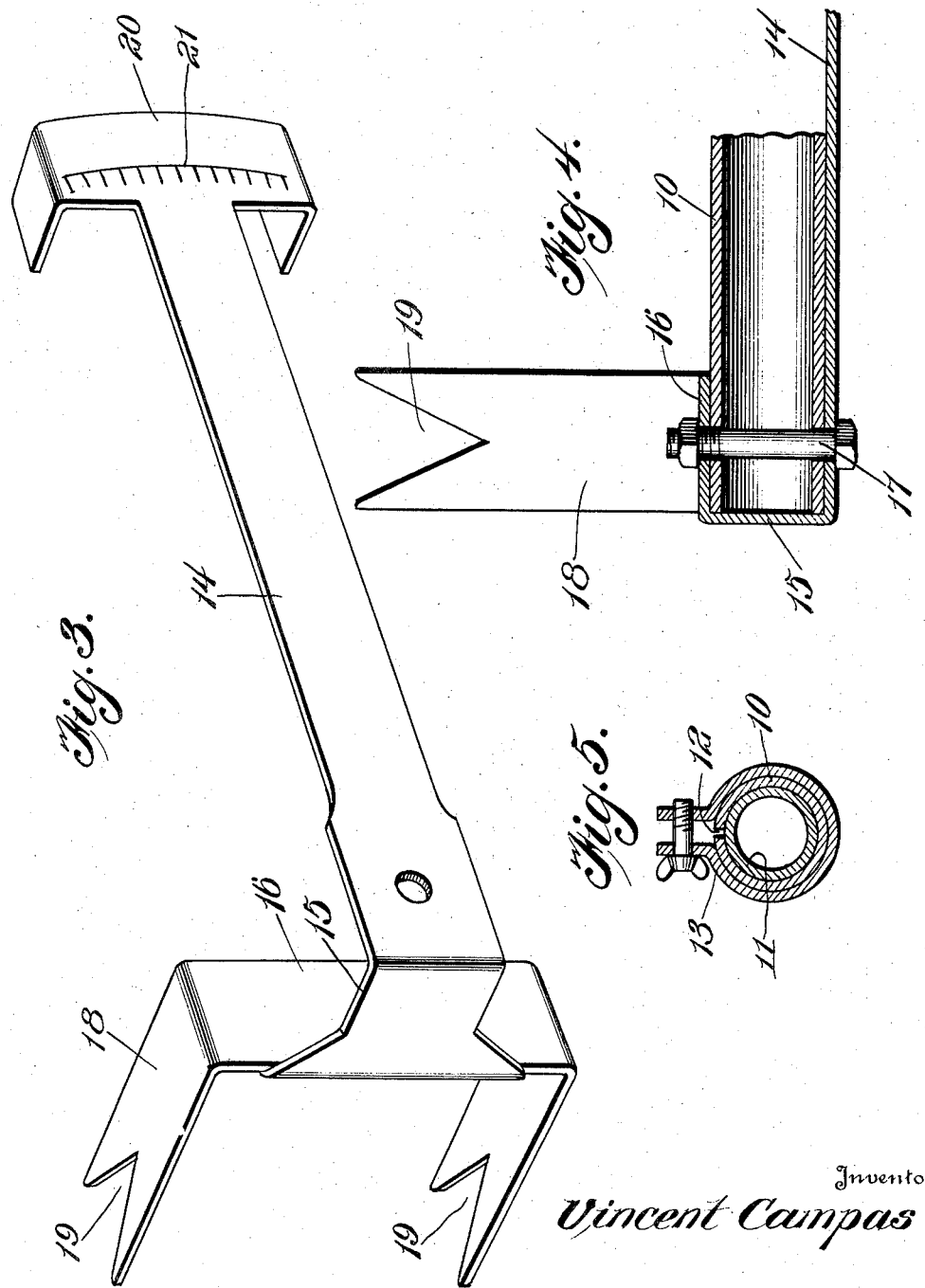
Inventor
Vincent Campas
Watson E. Coleman
Attorney Patented Apr. 28, 1925.

1,535,574

UNITED STATES PATENT OFFICE.

VINCENT CAMPAS, OF PASO ROBLES, CALIFORNIA.

WHEEL GAUGE.

Application filed May 27, 1924. Serial No. 716,248.

*To all whom it may concern:*

Be it known that I, VINCENT CAMPAS, a citizen of the United States, residing at Paso Robles, in the county of San Luis Obispo and State of California, have invented certain new and useful Improvements in Wheel Gauges, of which the following is a specification, reference being had to the accompanying drawings.

This invention relates to wheel gauges for vehicles and more particularly to a gauge for determining the "toe" or vertical inclination of the steering wheels of a vehicle.

This vertical inclination is determined by king bolts arranged at opposite ends of the vehicle axle and is often effected by a bending of the axle, so that the front or steering wheels are unevenly toed rendering the same more difficult to steer and more liable to cause wear upon the tires thereof. It will be obvious that in straightening a bent axle it is very difficult to make proper measurements to determine whether or no both king bolts are arranged at the same vertical angle, and the object of this invention is accordingly the provision of a gauge whereby it may be readily determined whether or no in this straightening of the axle these king bolts are being so maintained.

A still further object of the invention is to provide a device of this character which may be very cheaply produced, which is readily applied to the vehicle, and which has as few working parts as possible.

These and other objects I attain by the construction shown in the accompanying drawings, wherein for the purpose of illustration is shown a preferred embodiment of my invention and wherein:—

Figure 1 is a front elevation showing a gauge constructed in accordance with my invention applied to an axle;

Figure 2 is a plan view thereof;

Figure 3 is a perspective view of the dial member of the gauge;

Figure 4 is an enlarged sectional view through the pivot of the dial member;

Figure 5 is a sectional view through the clamp for holding the telescopic sections in adjusted position.

Referring now more particularly to the drawings, the gauge includes an extensible bar comprising a pair of telescopically engaged tube members 10 and 11, the member 10 or outer member being split, as indicated at 12, at the end thereof receiving the member 11 and having a clamp 13 whereby it may be tightened upon the section 11 to hold the same in adjusted position. Disposed at the free end of each of the tubes is a gauge member comprising a bar 14 extending longitudinally of the tube having its outer end bent across the end of the tube, as indicated at 15, and then inwardly as indicated at 16. This portion 16 is vertically disposed and is relatively wide and is secured to the tube 10 or 11, as the case may be, by means of a pivot bolt 17 extending through the tube, the vertical portion 16 and the bar 14. The ends of the vertical portion 16 are provided with rearwardly extending parallel flanges 18 the rear ends of which are provided with vertically aligned V-shaped notches 19.

The inner ends of the bars 14, or those ends disposed next adjacent the telescopically engaged ends of the tubes 10 and 11, are provided with transversely extending heads 20 having scales 21 thereon, these scales coacting with pointers 22 rigidly secured to the tubes 10 or 11, as the case may be. In the use of the device the tubes are adjusted until the rearwardly directed flanges 18 and the notches thereof are spaced apart a distance equal to the distance between the king bolts 23 of the axle 24 which is believed to be bent. These notches are engaged with the king bolts and if these bolts are parallel the pointer reading of the dials 21 will be the same. If it is found that these readings are not the same the gauge can be maintained in engagement with the king bolts and the axle straightened until the readings are the same.

It will be obvious that a device constructed as hereinbefore set forth is capable of a certain range of change and modification without materially departing from the spirit of my invention and I accordingly do not limit myself to such specific structure except as hereinafter claimed.

I claim:—

1. A gauge for the purpose described comprising an extensible bar having pointers and a member pivoted to each end of the bar and having a dial coacting with a pointer of the bar, said members swinging in one plane and having at the pivot points thereof extensions engageable at spaced points with the king bolts of an axle and by their engagement therewith determining the position of the dial with respect to the pointer.

2. A gauge of the character described comprising an extensible bar and a member pivoted at each end of the bar, each of said members having at one end thereof a dial gauge extending along one side of the bar and at the opposite end thereof a reverted portion extending at the opposite side of the bar and provided with a head, said head having extensions provided with notches adapted to receive the king bolts of an axle.

3. A gauge of the character described comprising an extensible bar and a member pivoted at each end of the bar, each of said members having at one end thereof a dial gauge extending along one side of the bar and at the opposite end thereof a reverted portion extending at the opposite side of the bar and provided with a head, said head having extensions provided with notches adapted to receive the king bolts of an axle, and pivot bolts for the members extending through the members, the bar and the reverted portions of the members.

4. A gauge of the character described comprising an extensible bar and a member pivoted at each end of the bar, each of said members having at one end thereof a dial gauge extending along one side of the bar and at the opposite end thereof a reverted portion extending at the opposite side of the bar and provided with a head, said head having extensions provided with notches adapted to receive the king bolts of an axle comprising parallel rearwardly directed flanges the rear ends of which are provided with vertically aligned V-shaped notches.

5. A gauge of the character described comprising an extensible bar and a member pivoted at each end of the bar, each of said members having at one end thereof a dial gauge extending along one side of the bar and at the opposite end thereof a reverted portion extending at the opposite side of the bar and provided with a head, said head having extensions provided with notches adapted to receive the king bolts of an axle, said bar being formed of two telescopically engaged sections, the outer section being split at its end and provided with a clamp for contracting the same upon the inner section.

In testimony whereof I hereunto affix my signature.

VINCENT CAMPAS.